United States Patent [19]

Rao

[11] Patent Number: 4,997,480
[45] Date of Patent: Mar. 5, 1991

[54] ALKYD RESINS AND THE USE THEREOF FOR HIGH SOLIDS COATINGS

[75] Inventor: Madhukar Rao, Cleveland Heights, Ohio

[73] Assignee: The Sherwin-Williams Company, Cleveland, Ohio

[21] Appl. No.: 371,691

[22] Filed: Jun. 12, 1989

Related U.S. Application Data

[63] Continuation of Ser. No. 35,564, Apr. 7, 1987, abandoned.

[51] Int. Cl.$^5$ .............................................. C08L 91/00
[52] U.S. Cl. ................................... 106/251; 106/243; 524/313; 524/377; 524/766
[58] Field of Search ................ 106/243, 251; 524/313, 524/377, 766

[56] References Cited

U.S. PATENT DOCUMENTS

| | | | |
|---|---|---|---|
| 2,494,559 | 1/1950 | Jubanowsky | 106/251 |
| 2,518,438 | 8/1950 | Beretvás | 106/243 |
| 2,795,564 | 6/1957 | Low | 106/243 |
| 3,328,186 | 6/1967 | Louton | 106/251 |
| 3,410,815 | 11/1968 | Phillips et al. | 204/181.6 |
| 4,056,495 | 11/1977 | Kawamura et al. | 428/458 |
| 4,072,642 | 2/1978 | Ritz et al. | 528/306 |
| 4,131,579 | 12/1978 | Mummenthey et al. | 106/252 |
| 4,147,675 | 4/1979 | Aritomi | 525/7 |
| 4,169,825 | 10/1979 | Yapp et al. | 523/454 |
| 4,504,609 | 3/1985 | Kuwajima et al. | 524/457 |
| 4,505,986 | 3/1985 | Geerdes et al. | 528/210 |
| 4,514,230 | 4/1985 | Passmore et al. | 106/243 |

OTHER PUBLICATIONS

Journal of Oil and Chemical Association (1977, vol. 60, pp. 11-17) "Molecular Structure and Film Properties of Alkyd Resins".

Primary Examiner—William R. Dixon, Jr.
Assistant Examiner—Helene Klemanski
Attorney, Agent, or Firm—Stevem W. Tam; Robert E. McDonald

[57] ABSTRACT

This invention relates to fatty acid modified alkyd resins and the use thereof in formulation of high solids interior and exterior paints capable of curing at ambient temperatures without the use of appreciable amounts of solvent. More specifically, the invention relates to high solids alkyd coatings derived from fatty acid oil modified alkyd resins having low viscosities capable of forming finishes that have good physical characteristics such as high gloss, resistance to humidity, excellent adhesion and a good hardness. These oil modified alkyd resins have number average molecular weights of less than about 6,000 and are derived from the polymerization of drying oil fatty acids, dibasic aromatic acids, polyols, at least one unsaturated monocarboxylic acid and an unsaturated monohydric alcohol.

16 Claims, No Drawings

ALKYD RESINS AND THE USE THEREOF FOR HIGH SOLIDS COATINGS

This is a continuation of co-pending application Ser. No. 07/35,564 abandoned filed on Apr. 7, 1987.

FIELD OF INVENTION

This invention relates to coating compositions, and more particularly, to coating compositions containing high solids alkyd resins capable of curing at ambient temperatures with comparatively small amounts of solvent. More specifically, the invention relates to high solids coatings capable of curing at ambient temperatures which comprises a fatty acid oil modified alkyd resin having a low viscosity which forms a finish that has good physical properties such as high gloss, resistance to humidity, excellent adhesion to metal substrates, and good hardness. The fatty acid modified alkyd resins also have improved heat stabilities and are useful as vehicles for both interior and exterior paints.

Conventional coatings which dry at room or ambient temperatures, usually contain substantial amounts of organic solvent, e.g. thinners, etc., which vaporize when applied to the substrate into the environment. These organic vapors are obviously detrimental and are considered a public nuisance, e.g. because of air pollution, etc. Various attempts to solve the air pollution problems have been accomplished, in part, by decreasing the amount of solvents in the coatings by utilizing lower viscosity resins. These coatings, however, prepared from the lower viscosity resins when applied as films of any substantial thickness, have a tendency to form wrinkles due to the low molecular weight of the resin and the comparatively small amount of solvent in the paint. Thus, the preparation of paints with minimum amounts of solvent, usually resulted in a defective film because the drying time is so short that the curing on the surface of the film is faster than the inner portion and therefore the difference in the curing rate between the surface and the inner portion of the film causes a distorted film. Moreover, most of the conventional high solids coatings have not been successful even after attempts were made to improve the cure of the inner portion of the film by utilizing metal driers, etc. It was found, in accordance with this invention, however, that the novel fatty acid oil modified alkyd resins can be used to form films of excellent hardness which dry rapidly to a tack-free finish, cure at room or ambient temperatures, and forms a film with outstanding physical properties including water-spot resistance, excellent adhesion to metal substrates, and good hardness.

SUMMARY OF THE INVENTION

It is a general object of this invention to provide a high solids alkyd resin for use in coating compositions which cure at ambient or room temperatures. It is another object of this invention to provide a coating composition of high solids which materially reduces the loss of solvent and the detrimental effects of air pollution. It is a further object of this invention to provide a method of preparing a high solids coating composition utilizing a novel fatty acid oil modified alkyd resin which cures at ambient temperatures. It is a further object of this invention to provide a coating composition comprising an oil modified alkyd resin which has been improved with an unsaturated monocarboxylic acid alone or in combination with an unsaturated monohydric alcohol which will not polymerize at the double bond at esterification temperatures used in the preparation of the alkyd resin.

These and other objects of the invention will become apparent from a more detailed description of the invention as follows.

More specifically, this invention relates to air drying high solids fatty acid oil modified alkyd resins having a number average molecular weight of less than about 6,000 derived from the condensation polymerization of from about 45 to 70 parts by weight of at least one drying oil fatty acid comprising at least 52% by weight of linoleic and/or linolenic acids, from about 4 to 15 parts by weight of at least one dibasic aromatic acid, such as isophthalic acid or the anhydride thereof, from about 10 to 28 parts by weight of at least polyol selected from the group consisting of pentaerythritol, dipentaerythritol and mixtures thereof, from about 4 to 15 parts by weight of at least one chain stopper, i.e. an unsaturated monocarboxylic acids and from about 0 to 15 parts by weight of an unsaturated monohydric alcohol. These chain stoppers are characterized as mono-functional acids and alcohols capable of limiting the molecular weight of the alkyd resin but will not polymerize at the double bond at temperatures where the dibasic acids are esterified with the polyol.

More specifically, this invention relates to the method of preparing air drying high solids fatty acid oil modified alkyd resins having number average molecular weights of less than about 6,000, e.g. less than 4,000, which are derived from the condensation polymerization at temperatures ranging up to about 475° F., from about 45 to 70 parts by weight of at least one drying oil fatty acid comprising at least 52% by weight of linoleic and/or linolenic acids, from about 4 to 15 parts by weight of at least one dibasic aromatic acid or the anhydride thereof, from about 10 to 28 parts by weight of at least one polyol selected from the group consisting of pentaerythritol, dipentaerythritol and mixtures thereof, from about 4 to 15 parts by weight of at least one chain stopper, i.e. an unsaturated monocarboxylic acid and 0 to 15 parts by weight of an unsaturated monohydric alcohol.

DETAILED DESCRIPTION OF THE INVENTION

More specifically, the invention relates to fatty acid oil modified alkyd resin compositions useful as coatings having excellent hardness, resistance to bending, resistance to impact and capable of being used for preparing comparatively thick films without forming defective surfaces.

In general, these oil modified alkyd resins are prepared from polybasic acids or anhydrides such as phthalic anhydride, polyhydric alcohols and unsaturated fatty acids wherein said fatty acids comprises at least 52% by weight of linoleic acid and/or linolenic acid. These oil modified alkyd resins harden as a result of the double bonds of the unsaturated fatty acid in a crosslinking reaction because of the oxygen in the air during the air drying process. With the assumption that these fatty acid oils react with the glycerin forming triglycerides, the percent of triglyceride in the resin is referred to as the oil length. The oil length of the resin determing the physical properties, such as hardness, solubility, weather resistance, etc. For example, where an increase in the oil length results in an increase in the flexibility of the film and its solubility in organic solvents, it also tends to decrease the hardness of the paint film. However, a decrease in the oil length not only improves the luster, but also tends to decrease the spreadability of the paint. Further, it is understood that the oil length is not the only factor which influences the physical characteristics of the film, but that film properties are also influenced by other ingredients of the alkyd resin.

Accordingly, to avoid many of the problems encountered in the preparation of high solids coatings, it was found necessary to use the fatty acid oil modified alkyd resin prepared in accordance with this invention. These modified alkyd resins have a number average molecular weight of less than about 6,000, and preferably less than 4,000, and are derived from the condensation polymerization of from about 45 to 75 parts, and preferably from about 50 to 65 parts by weight of at least one drying oil fatty acid comprising at least 52% by weight, e.g. from 52% to 70%, of linoleic and/or linolenic acids, from about 4 to 15 parts by weight, and preferable from about 7 to 10 parts by weight, of at least one dibasic aromatic acid or the anhydride, such as phthalic anhydride, from about 10 to 28 parts by weight, and preferable 18 to 22 parts by weight of at least one polyol selected from the group consisting of pentaerythritol, dipentaerythritol and mixtures thereof, from about 4 to 15 parts by weight, and preferably from 7 to 10 parts by weight of at least one chain stopper characterized as an unsaturated monocarboxylic acid and from 0 to 15 parts by weight, e.g. 4 to 10 parts, of an unsaturated monohydric alcohol. According to this invention, it is essential to have the oil modified alkyd resins with oil lengths of from about 35 to 75% modified with a chain stopper consisting of an unsaturated monocarboxylic acid alone or in combination with an unsaturated monohydric alcohol which will not polymerize at the double bond at esterification temperatures.

The fatty acids used to form the oil modified alkyd resins of this invention include, for example, fats and oils such as linseed oil, soya bean oil, safflower oil, tall oil, dehydrated castor oil or fatty acids separated from these oils. Particularly preferred are the unsaturated fatty acids, e.g. dehydrated castor oil fatty acids and safflower oil fatty acids, containing more than 52% in the fatty moiety of linoleic and linolenic acid, independently or as mixtures thereof. Synthetic mixtures of any the drying oil fatty acids can be used provided that the acid comprises at least 52% of linoleic, linolenic and/or conjugated linoleic acid. When drying oils or their unsaturated fatty acids, e.g. linoleic acid, are used as the modifying reactant in accordance with this invention, the resulting alkyd resins harden more rapidly at room temperatures due to the greater ease of oxidation and polymerization of the unsaturated acids.

The modified alkyd resins may be formed by various methods, including, for example, by first reacting the fatty acid and the polyol with the unsaturated monobasic fatty acid and then with the dibasic acid, e.g. phthalic anhydride or acid. Depending on the reaction conditions, interesterification will occur in the early stages of the reaction prior to the subsequent polymerization reactions.

The polyols include pentaerythritol and dipentaerythritol and various mixtures thereof in any proportion which are esterified with the unsaturated fatty acid and the dibasic acid at temperatures ranging up to about 380° F.

The aromatic polybasic acid and the anhydrides used in forming the alkyd resins include phthalic acid, phthalic anhydride, isophthalic acid, terephthalic acid, tetrahydrophthalic anhydride, hexahydrophthalic anhydride, endomethylene tetrahydrophthalic anhydride and various mixtures of one or more of these polybasic acids in any proportion.

The chain stopping acids and alcohols include the unsaturated monohydric alcohols and the unsaturated monocarboxy acids which will not polymerize at the double bond at the esterification temperatures used in the preparation of the alkyd resin. More specifically, the unsaturated monocarboxylic acids, such as crotonic acid, may be characterized by the formula:

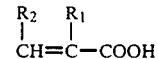

wherein $R_1$ is either hydrogen or an alkyl group of 1 to 3 carbon atoms and $R_2$ is an aliphatic group of 1 to 4 carbon atoms or an aryl group. The preferred unsaturated monocarboxy acids include the crotonic acid, tiglic acid, cinnamic acid, and various mixtures of any of these acids in any proportion.

In addition to using the monocarboxy unsaturated acids as the chain stopper, certain monohydric alcohols which contain unsaturation can be used in amounts ranging from about 0 to 15, and preferably from about 4 to 10 parts by weight of the resin in combination with the unsaturated monobasic acids. These alcohols include, for example, the allylic alcohols represented by the formula:

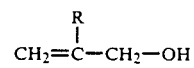

wherein R is hydrogen or a $C_1$ to $C_4$ alkyl radical, such as methyl, ethyl, propyl or butyl. The preferred alcohol, however, is allyl alcohol, wherein R is hydrogen. Thus, the esterified products derived from the drying oil fatty acid, the polyol, e.g. pentaerythritol, and the dibasic aromatic acid, i.e. phthalic acid or anhydride, may be terminated with a monounsaturated monohydric alcohol, such as the allylic alcohols or some other monohydric alcohol, such as butene-1-ol-3, pentene-1-ol-3, dodecene1-ol-12, and particularly trimethylolpropane diallyl ether, etc.

In accordance with this invention, the modified alkyd resins derived from the fatty acids, dibasic aromatic acids and polyols are modified with the unsaturated monocarboxylic acid alone or in combination with the unsaturated monohydric alcohol. For example, the unsaturated monocarboxylic acids, such as crotonic acid, introduced into the oil modified alkyd may react similarly as the fatty acid and be present as a side chain in the alkyd resin. Preferably, the fatty acid, the polybasic acid and polyhydric alcohol are first reacted and then subsequently the unsaturated monocarboxylic acid with or without the monohydric alcohol are reacted with that product. The latter process is particularly preferred to prevent gelling during the reaction process.

The oil modified resins useful for purposes of this invention have hydroxyl numbers ranging from 20-90 and oil lengths ranging from about 35 to 75%, and preferably from 50% to 70%. If the oil length is less than about 35%, for example, the film will be less resistant to water, but on the other hand, if the oil length is higher than about 75%, the film will be less hard.

The fatty acid oil modified alkyd resins prepared according to this invention are illustrated as follows:

EXAMPLE I (Poly 24)

| Reactants | Parts By Weight |
|---|---|
| Linoleic Acid | 58 |
| Dipentaerythritol | 22 |
| Isophthalic Acid | 10.0 |
| Crotonic Acid | 10.0 |
| Xylene | 2.5 |

The linoleic acid was charged in a 5-liter, 3-neck, roundbottom flask equipped with inert gas tube, mechanical stirrer, barrett tube and condenser. The linoleic acid was heated to about 300° F. and the dipentaerythritol was added at about 380° F. and the reaction was held at this temperature for about 30 minutes. The isophthalic and crotonic acids and xylene were added to the reactor and then the reaction mixture heated to temperatures ranging up to 470°–480° F. The final product had an acid number less than 12, a viscosity of $Z-Z_2$ and a 90% non-volatile material in mineral spirits. The molecular parameters include an oil length of 66 and a hydroxyl number of 52.

EXAMPLE II (Poly 25)

| Reactants | Parts By Weight |
|---|---|
| Linoleic Acid | 59.0 |
| Dipentaerythritol | 18.0 |
| Trimethylolpropane Diallyl Ether | 8.0 |
| Isophthalic Acid | 7.5 |
| Crotonic Acid | 7.5 |
| Xylene | 2.5 |

The linoleic acid was charged to a 5-liter, 4-neck, roundbottom flask equipped with inert gas tube, mechanical stirrer, barrett tube and condenser. The linoleic acid was heated to about 300° F. and the dipentaerythritol and trimethylolpropane diallyl ether were added to the reactor at a temperature ranging up to about 380° F. and held at that temperature for about 30 minutes. The isophthalic acid, crotonic acid and xylene were added to the reactor and the reaction mixture heated to temperatures ranging up to about 480° F. The final product had a non-volatile material (NVM) of about 96%, and an acid number of about 11.5 and a viscosity of W - Y.

EXAMPLE III (Poly 30)

| Reactants | Parts By Weight |
|---|---|
| Linoleic Acid | 58 |
| Dipentaerythritol | 22 |
| Isophthalic Acid | 10.0 |
| Crotonic Acid | 10.0 |
| Xylene | 2.5 |

The linoleic acid was charged to a 5-liter, 3-neck, roundbottom flask equipped with inert gas, mechanical stirrer, a barrett tube and condenser. The linoleic acid was heated to about 300° F. and the dipentaerythritol was added to the reactor and heated to about 380° F. and held for 30 minutes. The isophthalic and crotonic acids were added to the reaction mixture and heated up to about 370° F. for about 30 minutes. The final product had a non-volatile material of 89%, an acid number of about 9.2, a hydroxyl number of 52, and viscosity of $Z_1-Z_2$.

EXAMPLE IV (Poly 35)

| Reactants | Parts By Weight |
|---|---|
| Linoleic Acid | 58.8 |
| Dipentaerythritol | 18.2 |
| Trimethanolpropane Diallyl Ether | 8.0 |
| Isophthalic Acid | 7.5 |
| Crotonic Acid | 7.5 |

The linoleic acid and dipentaerythritol were charged to a 5 liter, 4-neck, round-bottom flask equipped with inert gas, a mechanical stirrer, a barrett tube, a condenser and heated in the presence of a catalyst to temperatures of about 250° F. At this temperature, the isophthalic and crotonic acids together with 80.5 parts by weight of xylene were added to the reaction mixture which was held at a temperature of about 370° F. for about one hour. The temperature was then increased to about 480° F. and held. The reaction product had a viscosity of W-Y, an acid number of less than about 12 and NVM of 96%.

EXAMPLE V (Poly 44)

| Reactants | Parts By Weight |
|---|---|
| Linoleic Acid | 58.0 |
| Pentaerythritol | 18.8 |
| Crotonic Acid | 4.7 |
| Isophthalic Acid | 18.6 |
| Xylene | 2.5 |

The linoleic and pentaerythritol were added to a 3-liter, 5-neck, round-bottom flask equipped with inert gas, a mechanical stirrer, barrett tube and condenser. The reactants were heated to temperatures ranging up to 270° F. and the crotonic and isophthalic acids and xylene were added to the reaction mixture and heated to about 370° F. and held at this temperature for about one hour. The product was then heated to about 470° F. The final product had a non-volatile material (NVM) of about 91%, viscosity was $Z_4-Z_5$ in mineral spirits and the acid number was 11.8. The molecular parameters include an oil length of 66% and a hydroxyl number of 55.

As illustrations, the polydispersity ratios of Examples I and II are particularly set forth in Table 1.

TABLE 1

| Example | ($M_Z$) Z Average Molecular Weight | ($M_W$) W Average Molecular Weight | ($M_N$) N Average Molecular Weight | Polydispersity ($M_W \div M_N$) |
|---|---|---|---|---|
| I | 28,145 | 8,542 | 3,524 | 2.42 |
| II | 8,265 | 4,559 | 3,005 | 1.52 |

In the formulation of paints, it is obvious that various additives can be used in combination with the modified alkyd resins of this invention, including, for example, such additives as fillers, coloring agents, stabilizers, thickening agents, pigments, dispersing agents and the like.

An important aspect of the oil modified alkyd resins of this invention, is that the formulated paints are substantially free of solvent but as an alternative, where necessary, various paint solvents can be used to form a solvent-type coating. These materials include conventional solvents or diluents as xylene, benzene, toluene, mineral spirits, and the like. Approximately 1 to 25% by weight based on the amount of the alkyd resin of the diluent can be used in formulating the coatings.

Of particular importance in formulating the coatings various hardening agents may be utilized in the formulas, including the redox catalyst, e.g. organic peroxides, in combination with reducing agents and in conjunction with various metal driers, such as the magnesium and cobalt salts of naphthenic acid. Of the various hardening agents, the cobalt naphthenate is particularly useful because it functions, not only as a reducing agent, but also as a metal drying agent which participates in the oxidation hardening of the oil modified alkyd resin. These organic metal driers are added to the coating in amounts ranging from 0.01 to about 6% by weight based on the weight of the coating. These metal driers are well known and include such compounds as salts of cobalt, copper, lead, zirconium, calcium, nickel, zinc, tin, iron, and particularly the cobalt and zirconium salts of naphthenic acid such as cobalt naphthenate, copper naphthenate, lead tallate, calcium naphthenate, iron naphthenate, lead naphthenate, nickel octoate, zirconium naphthenate, zirconium octoate, zinc octoate, and the alkyl tin laurates such as dibutyl tin dilaurate, etc.

Typical pigments used in the coating compositions include the various metal oxides, such as titanium dioxide, zinc oxide, iron oxide, and metal flakes, such as aluminum or bronze flakes, metal powders, and the molybdate pigments, such as molybdate, orange pigments, sulfate pigments, carbonate pigments, carbon black, silica pigments and various other organic or inorganic pigments commonly used in the preparation of coatings. Pigments are generally based on the weight of the binder or vehicle in a ratio of about 0.5-100 to 200-1 where the binder or vehicle is the film forming constituent of the coating. In formulating paints, it is a practice in addition to including the primary pigments, such as $TiO_2$, to use other materials such as fillers or extenders, e.g. the carbonates, talcs, silicates, clays, micas, and the like in combination with the primary pigment. The relative proportions of the primary pigment and the fillers or extenders is not critical and may be varied over a wide range. Generally, however, the primary pigments are present at a pigment volume concentration to provide the desired paint covering or hiding, whereas the extender pigment is present in amounts to provide the paint with the total required pigment volume concentration.

Plasticizers may be added to the coatings in amounts ranging up to about 30% by weight based on the weight of the vehicle, and more likely in amounts ranging from 10 to 20% by weight of the vehicle. For example, the linseed oil glycerol phthalate ester is a preferred plasticizer for the alkyd resins.

Typical paint formulations utilizing the novel modified alkyd resins of this invention are illustrated in Examples VI-IX:

EXAMPLE VI (paint formulation)

| Components | Parts By Weight |
|---|---|
| Isophthalic Alkyd Resin (Vardydol) | 181.68 |
| Aliphatic Naphtha | 129.00 |
| Linoleic High Solids Alkyd Resin of Example I (Poly 24) | 206.47 |
| Bentone 34 | 5.0 |
| Propylene Carbonate | 1.31 |
| Defoamer | 1.32 |
| Rhedx-1 (40% castor oil in mineral spirits) | 6.0 |
| Lecithin | 25.93 |
| $TiO_2$ | 213.0 |
| Calcium Carbonate | 250.0 |
| Cobalt Salt Catalyst | 0.62 |
| Zirconium 2-ethylhexoate as drier | 30.76 |
| Calcium Salt Synthetic Acid as drier | 1.85 |
| Dri-RX Drier (2-2'-Bipyridyl) | 1.0 |
| Methylethyl Ketoxime | 2.0 |
| Colorant | — |

Rhedx-1 is 40% by weight of dehydrated castor oil in mineral spirits. Varkydol is a commercial alkyd resin characterized as a long oil alkyd derived from a fatty acid oil, isophthalic acid and pentaerythritol. This resin is characterized as an amber liquid, slightly viscous, 100% non-volatile material, Gardner viscosity minimum of X and maximum of Z, and an acid number of about 7.

EXAMPLE VII

| Components | Parts By Weight |
|---|---|
| Example I (poly 24) | 178.59 |
| Bentone 34 | 10.0 |
| Aliphatic Naphtha | 58.5 |
| Propylene Carbonate | 2.6 |
| Rhedx-1 (40% castor oil in mineral spirits) | 8.4 |
| Lecithin | 7.0 |
| $TiO_2$ | 213.0 |

In addition, mixtures or blends of the modified alkyd resins of this invention having different molecular weights may be used in formulating paints as illustrated in Example VIII:

EXAMPLE VIII (paint formulation)

| Components | Parts By Weight |
|---|---|
| Example II (Poly 25) | 214.17 |

| (paint formulation) | |
|---|---|
| Components | Parts By Weight |
| Example VII | 61.89 |
| Aliphatic Naphtha | 117.22 |
| Cobalt Catalyst | 1.4 |
| Zirconium 2-ethylhexoate | 18.6 |
| Calcium Synthetic Acid Drier | 8.38 |
| Dri-RX Drier (2-2'-Bipyridyl) | 1.0 |

General paint formulas using the modified alkyd resins of this invention are illustrated in Example IX:

EXAMPLE IX

| (paint formula) | |
|---|---|
| Components | Parts By Weight |
| Modified Alkyd Resin of Example I | 20 to 60 |
| Organic Solvent (e.g. Naphtha) | 5 to 20 |
| Pigment (i.e. TiO$_2$) | 15 to 40 |
| Fillers (e.g. Carbonates) | 0 to 30 |
| Extenders | 0 to 5 |
| Driers | 0.01 to 10 |
| Catalyst (e.g. Cobalt Salts) | 0.01 to 1.0 |
| Defoamers (e.g. Silicones) | 0.01 to 2.0 |

The coatings prepared from the modified alkyd resins of this invention may be applied to various substrates including metal surfaces by conventional techniques, such as brushing, roller coating, and the like. Moreover, the paint formulas may be applied to either treated or untreated surfaces, e.g. phosphated surfaces, which are then allowed to dry at ambient or room temperatures.

While this invention has been described with respect to a number of specific embodiments, it is obvious that there are other variations and modifications which can be made without departing from the spirit and scope of the invention as more particularly set forth in the appended claims.

The invention claimed is:

1. An air-drying high solids modified alkyd resin having a number average molecular weight of less than about 6,000 consisting essentially of the condensation polymerization product of:
   (a) from about 45 to 70 parts by weight of at least one drying oil fatty acid comprising at least 52% by weight of linoleic acid and/or linolenic acid,
   (b) from about 4 to 15 parts by weight of at least one dibasic aromatic acid or anhydride,
   (c) from about 10 to 28 parts by weight of at least one polyol selected from the group consisting of pentaerythritol, dipentaerythritol and mixtures thereof,
   (d) from about 4 to 15 parts by weight of at least one unsaturated monocarboxylic acid, and
   (e) from about 4 to 10 parts by weight of an unsaturated monohydric alcohol.

2. The air drying high solids modified alkyd resin of claim 1 further characterized as having a number average molecular weight of less than 4,000 and a hydroxyl number of from about 20 to 90.

3. The air drying high solids modified alkyd resin of claim 2 further characterized in that the unsaturated monocarboxylic acid of crotonic acid.

4. The air drying high solids modified alkyd resin of claim 3 further characterized in that the unsaturated monohydric alcohol is trimethylolpropane diallyl ether present in amounts of from about 4 to 10 parts by weight.

5. The air drying high solids modified alkyd resin of claim 3 further characterized in that the drying oil fatty acid contains from about 52% to 70% by weight of linoleic and/or linolenic acid and the dibasic aromatic acid is isophthalic acid.

6. A process of preparing an air drying high solids modified alkyd resin having a number average molecular weight of less than about 6,000 and consisting essentially of the condensation polymerization product at temperatures ranging up to about 475° F. of
   (a) from about 45 to 70 parts by weight of at least one drying oil fatty acid comprising at least 52% by weight of linoleic and/or linolenic acid,
   (b) from about 4 to 15 parts by weight of at least one dibasic aromatic acid or anhydride,
   (c) from about 10 to 28 parts by weight of at least one polyol selected from the group consisting of pentaerythritol, dipentaerythritol and mixtures thereof,
   (d) from about 4 to 15 parts by weight of at least one unsaturated monocarboxylic acid,
   (e) from about 4 to 10 parts by weight of an unsaturated monohydric alcohol.

7. The process of claim 6 further characterized in that the unsaturated monocarboxylic acid is added to the condensation reaction at temperatures ranging up to about 380° F.

8. The process of claim 6 further characterized in that the unsaturated monocarboxylic acid is crotonic acid and the dibasic aromatic acid is isophthalic acid or isophthalic anhydride.

9. The process of claim 6 further characterized in that the unsaturated monohydric alcohol is trimethylolpropane diallyl ether present in amounts ranging from about 4 to 10 parts by weight.

10. An air drying high solids alkyd coating comprising about 20 to 60 parts by weight of a fatty acid modified alkyd resin, 5 to 20 parts by weight of an organic solvent, 15 to 40 parts by weight of an inorganic pigment, 0 to 30 parts by weight of an inorganic extender, and up to 10 parts by weight of a drier consisting essentially of a metal drier selected from the group consisting of salts of cobalt, copper, lead, zirconium, calcium, nickel, zinc, tin, iron, and mixtures thereof; said alkyd resin having a number average molecular weight of less than about 6,000 and consisting essentially of the condensation polymerization product of:
   (a) from about 45 to 70 parts by weight of at least one drying oil fatty acid comprising at least 52% by weight of linoleic and/or linolenic acid,
   (b) from about 4 to 15 parts by weight of at least one dibasic aromatic acid or anhydride,
   (c) from about 10 to 28 parts by weight of at least one polyol selected from the group consisting of pentaerythritol, dipentaerythritol and mixtures thereof,
   (d) from about 4 to 15 parts by weight of at least one unsaturated monocarboxylic acid, and
   (e) from about 4 to 10 parts by weight of an unsaturated monohydric alcohol.

11. The high solids alkyd coating of claim 10 further characterized in that the unsaturated monocarboxylic acid is crotonic acid and the dibasic aromatic acid or anhydride is isophthalic acid or the anhydride.

12. The air drying air solids alkyd coating of claim 10 further characterized in that the inorganic pigment is titanium dioxide.

13. The air drying high solids alkyd coating of claim 10 further characterized in that the alkyd resin has a number average molecular weight of less than 4,000 and a hydroxyl number of from about 20 to 90.

14. The high solids alkyd coating of claim 13 further characterized in that the unsaturated monocarboxylic acid is crotonic acid.

15. The air drying high solids alkyd coating of claim 14 further characterized in that the unsaturated monohydric alcohol is trimethylolpropane diallyl ether present in amounts ranging from about 4 to 10 parts by weight.

16. The air drying high solids alkyd coating of claim 15 further characterized in that the drying oil fatty acid contains from about 52% to 70% by weight of linoleic and/or linolenic acid and the dibasic aromatic acid is isophthalic acid.

* * * * *